United States Patent
Weinl et al.

(10) Patent No.: US 11,767,914 B2
(45) Date of Patent: Sep. 26, 2023

(54) DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

(71) Applicant: ZF Friedrichshafen AG, Friedrichshafen (DE)

(72) Inventors: Florian Weinl, Bodolz (DE); Thomas Schwegler, Tettnang (DE); Maik Wiesner, Weingarten (DE); Dirk Leutheuser, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 140 days.

(21) Appl. No.: 17/111,850

(22) Filed: Dec. 4, 2020

(65) Prior Publication Data
US 2021/0172522 A1 Jun. 10, 2021

(30) Foreign Application Priority Data
Dec. 5, 2019 (DE) ...................... 10 2019 218 977.6

(51) Int. Cl.
*F16H 63/34* (2006.01)
*F15B 15/26* (2006.01)

(52) U.S. Cl.
CPC ..... *F16H 63/3475* (2013.01); *F16H 63/3483* (2013.01); *F15B 15/261* (2013.01)

(58) Field of Classification Search
CPC ..... F15B 15/261; F16H 63/3458–3475; F16H 63/3483
See application file for complete search history.

(56) References Cited

U.S. PATENT DOCUMENTS 4,586,425 A * 5/1986 Redman ................ F15B 15/261
92/24
8,053,691 B2 * 11/2011 Vernacchia ............. F16H 61/22
200/61.54

(Continued)

FOREIGN PATENT DOCUMENTS

DE 102013213678 A1 1/2015
DE 102015214287 A1 * 2/2017

(Continued)

OTHER PUBLICATIONS

German Search Report DE 10 2019 218 977.6, dated Feb. 6, 2020. (10 pages).

*Primary Examiner* — Ernesto A Suarez
*Assistant Examiner* — James J Taylor, II
(74) *Attorney, Agent, or Firm* — Dority & Manning, P.A.

(57) ABSTRACT

In a device for locking a piston rod of a piston of an actuator, an armature rod of an electromagnet is axially movable counter to a preloading spring and includes two actuating contours. Latching mechanisms are operable to mechanically fix the piston. An axial distance between base points of the actuating contours is such that the piston is mechanically fixable by only one of the latching mechanisms in each case. Interlocking elements of both latching mechanisms are accommodated in an axially fixed manner in a sleeve, are radially displaceable, and are selectively engageable with the piston.

11 Claims, 7 Drawing Sheets

(56) References Cited

U.S. PATENT DOCUMENTS

| | | | |
|---|---|---|---|
| 9,062,766 B2 | 6/2015 | Mayr | |
| 2005/0103926 A1 | 5/2005 | Hawthorne | |

FOREIGN PATENT DOCUMENTS

| | | |
|---|---|---|
| DE | 102016221477 A1 | 5/2018 |
| EP | 1960701 B1 | 6/2009 |
| WO | WO 2018/082949 | 5/2018 |

* cited by examiner

DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

CROSS-REFERENCE TO RELATED APPLICATION

The present application is related and has right of priority to German Patent Application No. 10 2019 218 977.6 filed on Dec. 5, 2019, which is incorporated by reference in its entirety for all purposes.

FIELD OF THE INVENTION

The invention relates generally to a device for locking a piston rod of a piston of an actuator, which is pressurizable in order to disengage a parking lock and is spring-loaded in order to engage the parking lock.

BACKGROUND

In practical applications, devices including actuators, which are provided for actuating units, are utilized in many areas. For this purpose, the actuators can each be transferred at least into two different operating conditions. Moreover, as is known, the actuators can also be locked and/or held in the operating conditions with the aid of locking units. In order to avoid an undesirable exit of the operating conditions of the actuators, the locking units can be interlocked, with the aid of electrically actuatable interlocking units, in a condition locking the actuator as well as in a condition releasing the actuator.

Known passenger car automatic transmissions/automatic transmissions often encompass a parking lock system, with the aid of which a drive train of a vehicle can be fixed or released, as demanded. A parking lock of a parking lock system of this type is usually hydraulically disengaged and is engaged with the aid of a spring accumulator. In order to be able to hold a parking lock of this type in defined positions, a parking lock system of this type includes a locking mechanism. A locking mechanism of this type offers the possibility of holding a parking lock in the demanded operating condition with little input of power and of avoiding safety-critical operating conditions. Moreover, a desired redundancy can be implemented and a vehicle availability can be ensured with the aid of a locking mechanism of this type.

With respect to the locking and release of an actuator provided for actuating a parking lock, a multitude of various mechanisms, which provide a positive engagement for the purpose of locking, is known from practical experience. The positive engagement is implemented, for example, with the aid of ball stops, detent hooks, pins, and the like. Spring units and/or electromagnets are also often utilized for actuating the locking and release.

In a multitude of parking lock systems, the parking lock is disengaged in the hydraulically pressurized condition of a non-interlocked piston, which is spring-loaded in the engagement direction of the parking lock. In the non-pressurized condition of the piston, the parking lock is engaged, when the piston is not interlocked, with the aid of the spring unit resting against the parking lock.

In one further known parking lock system, in the energized condition of an electromagnet, the actuator is locked with the aid of a detent hook exclusively in the disengaged condition of the parking lock. It is additionally provided in this case that the piston is appropriately hydraulically actuated in the direction of the disengaged operation condition of the parking lock and against the spring force of a spring unit active at the piston in the direction of the engaged operating condition of the parking lock. If the supply voltage of the electromagnet fails in the disengaged condition of the parking lock, the parking lock undesirably transitions into the engaged operating condition when the piston is in the non-pressurized condition. Moreover, the parking lock is disengaged when the piston is pressurized in the event of a fault.

Therefore, this parking lock system includes no redundant mechanical protection for a remote start of a vehicle, during which a vehicle is started by a driver with the aid of a remote ignition key or with the aid of a radio remote control, without the driver being located in the vehicle. Thereupon, in the event of a fault, the driver cannot secure the started vehicle against rolling away by actuating the service brake. Therefore, the redundant protection against an undesirable engagement or disengagement of the parking lock is provided in the area of the hydraulic system, which, however, is structurally complex and generates high production costs.

Moreover, a parking lock system is known, in which the actuator is locked in the disengaged operating condition of the parking lock and in the energized condition of the electromagnet. In the event of a loss of the supply voltage, the disengaged parking lock transitions into the engaged operating condition due to a spring unit active at the non-pressurized piston in the direction of the engaged condition. In the engaged operating condition of the parking lock, the actuator is not locked. Therefore, a redundant mechanical protection against an undesirable disengagement of the parking lock—which, in the event of a fault, is caused by an undesirable pressurization of the piston—is not possible during a remote start. In this parking lock system, the redundancy is to be provided in the area of the hydraulics, which, however, is complex and generates high production costs.

Additionally, one further parking lock system is known, in which the actuator or the parking lock actuator is locked exclusively in the engaged condition of the parking lock when an electromagnet is in the energized condition. In the disengaged condition of the parking lock, no locking of the actuator is provided. In order to avoid an undesirable actuation of the parking lock, a permanent pressurization of the piston of the actuator is necessary in the disengaged condition of the parking lock. During a remote start, the electromagnet is to be energized in the engaged condition of the parking lock. The voltage necessary therefor is often not available during a remote start.

Some of the above-described parking lock systems can lock the actuator of a parking lock system in a non-energized condition, which is favorable with respect to energy, but, in the case of a voltage loss in the area of an automatic transmission, do not have the possibility to engage the parking lock in the non-energized condition of the electromagnet and, thereupon, lock the actuator. This means, the parking lock either unintentionally remains in the disengaged condition or transitions into the engaged condition, in which, however, the parking lock cannot be locked.

The actuator of one further parking lock system is locked in the engaged operating condition as well as in the disengaged operating condition of the parking lock in the non-energized condition of an electromagnet of an interlocking unit. This means, the actuator is released via an appropriate energization of a coil of the electromagnet, in order to be able to engage or disengage the parking lock. In the case of a failure of the supply voltage, the parking lock remains in a present operating condition due to the locked condition of the actuator. Therefore, the engaged parking lock can be disengaged only by appropriately energizing the interlocking unit, whereby a vehicle cannot be towed in the event of a fault, for example. In addition, in the case of a failure of a power supply or in the case of a loss of the supply voltage of the parking lock system, the parking lock cannot be engaged and, therefore, a vehicle cannot be secured against rolling away, which is undesirable and possibly also critical to safety.

An inversion of the latter-described logic results in a parking lock system, in which the parking lock or the associated actuator, energized in the disengaged condition of the parking lock, can be locked. These types of parking lock systems are not remote start-capable, however, since their actuators can be locked only in the energized condition of the electromagnet when the parking lock is in the engaged condition. It is to be assumed, however, that the supply voltage of the electromagnet collapses during a remote start and an energization of the locking mechanism cannot be ensured. In order to nevertheless be able to actuate the parking lock to the desired extent, complex technical measures are to be provided in the area of the hydraulic supply of the actuator.

SUMMARY OF THE INVENTION

Example aspects of the present invention provide an improved device for locking a piston rod of a piston of an actuator, which is pressurizable in order to disengage a parking lock and is spring-loaded in order to engage the parking lock.

The device according to example aspects of the invention for locking a piston rod of a piston of an actuator, which is pressurizable in order to disengage a parking lock and is spring-loaded in order to engage the parking lock, includes an electrically actuatable electromagnet. An armature rod of the electromagnet is axially movable against the spring force of a preloading spring and is designed including two actuating contours, which are axially spaced apart from one another and face one another. The actuating contour close to the magnet is associated with a first latching mechanism, with the aid of which the piston is mechanically fixable in the engaged condition of the parking lock. The actuating contour remote from the magnet is associated with a second latching mechanism, with the aid of which the piston is mechanically fixable in the disengaged condition of the parking lock.

An axial distance between a base point of the first actuating contour and a base point of the second actuating contour is sized such that the piston is mechanically fixable by only one of the latching mechanisms in each case. Both latching mechanisms are centrally arranged within the piston. Interlocking elements of both latching mechanisms are accommodated in a housing-affixed component in an axially fixed manner. Additionally, the interlocking elements of the latching mechanisms are radially displaceable with respect to the sleeve and can be brought into engagement or out of the engagement with the piston by the particular associated actuating contour.

The actuating contour remote from the magnet blocks a movement of the interlocking elements of the associated latching mechanism counter to the spring force of the preloading spring in the disengaged condition of the parking lock and in the energized condition of the electromagnet, and releases the interlocking elements with the aid of the preloading spring in the non-energized condition of the electromagnet.

In addition, the actuating contour close to the magnet blocks a movement of the interlocking elements of the associated latching mechanism with the aid of the preloading spring in the engaged condition of the parking lock and in the non-energized condition of the electromagnet, and releases the interlocking elements against the spring force of the preloading spring in the energized condition of the electromagnet.

With respect to the present parking lock design according to example aspects of the invention, the parking lock is locked in the disengaged condition and in the energized condition of an interlocking unit, which includes the armature rod and the electromagnet, as well as in the engaged condition and in the non-energized condition of the interlocking unit.

Moreover, the parking lock having the parking lock design provided according to example aspects of the invention is released in the engaged condition and in the energized condition of the interlocking unit and is released in the disengaged condition and in the non-energized condition of the interlocking unit.

Therefore, a locking concept dependent on the condition of the parking lock or a hybrid parking lock unit is made available, which meets the requirements described in greater detail in the following.

A remote start of a prime mover of a vehicle, whose output shaft can be interlocked or held with the aid of the parking lock, is possible without an electrical power supply of the electromagnet of the interlocking unit, since the parking lock is held locked in the engaged condition in the non-energized condition of the interlocking unit.

Moreover, safety-critical situations of a vehicle designed including the parking lock system according to example aspects of the invention are also given in an absence of the voltage supply of the transmission or in the case of a failure of the supply voltage of the interlocking unit, since the parking lock is released in the disengaged condition when the interlocking unit and/or the electromagnet is in the non-energized condition.

In addition, a changeover is possible starting from the disengaged condition of the parking lock into the engaged condition as compared to known parking lock systems without energization of the locking unit as well as a subsequent locking of the parking lock in the engaged condition. Therefore, in the event of a fault, an undesirable disengagement of the parking lock is prevented in a simple way.

Additionally, the parking lock, in the disengaged condition, can be held locked by the interlocking unit and secured against an undesirable engagement of the parking lock with the aid of a small amount of electrical energy.

The locking of the parking lock is deactivatable in the engaged condition in a simple way by energizing the coil of the electromagnet of the interlocking unit, so that the parking lock is disengageable as demanded.

In a structurally simple embodiment of the device according to example aspects of the invention, which is operable with little risk of jamming, the actuating contours are designed at least approximately in the shape of a truncated cone, at least partially or in sections. Moreover, the base points can each have the smallest outer diameters of the actuating contours and the outer diameters of the actuating contours can each constantly increase, at least in areas, starting from the base points, as the axial distance from the base points increases.

In an installation space-favorable embodiment of the device according to example aspects of the invention, the piston is designed including a groove at an inner side facing the armature rod. The interlocking elements of the latching mechanisms can be insertable into the groove, in a latching manner, at least in areas, with respect to the armature rod, in the radial direction outward by the respective actuating contours, and the piston rod, in the engaged condition or in the disengaged condition of the parking lock.

In the latched condition of one of the latching mechanisms, with the aid of which the piston rod is held in the engaged condition of the parking lock, if the armature rod has a first axial end position, the current operating condition of the latching mechanisms is determinable on the basis of the current position of the armature rod with little outlay.

The current operating condition of the latching mechanisms is then also determinable with little outlay if the armature rod has a second axial end position in the latched condition of one of the latching mechanisms, with the aid of which the piston rod is held in the disengaged condition of the parking lock.

In the released condition of both latching mechanisms, the armature rod can have an axial intermediate position between the two end positions, whereby the released condition of the piston and, therefore, of the parking lock, is determinable in a simple way.

In a structurally simple refinement of the device according to example aspects of the invention, the latching mechanisms are designed as ball stops, which include balls as interlocking elements.

It can be provided that both ball stops are centrally arranged within the piston. Balls of both ball stops can be accommodated in an axially fixed manner in the component designed as a housing-affixed sleeve. Additionally, it is then possible that the balls of the ball stops are radially displaceable with respect to the sleeve and can be brought into engagement or out of the engagement with the piston by way of rolling at the particular associated actuating contour.

The interlocking elements of the latching mechanisms can also be designed as spring arms, whose first ends are fixed on the housing side and whose second ends can each be swiveled with respect to the first ends by way of the actuating contours and, as a result, can be brought into engagement with the piston in a form-locking manner or out of the engagement with the piston. These types of spring arms are known, for example, from EP 1 960 701 B1, which is incorporated by reference herein in its entirety.

An operating condition of the interlocking device is determinable in a simple way when a sensor for determining an axial actuating travel of the armature rod is provided.

It is possible that the sensor is designed as a Hall sensor, via which an actuating movement of the actuating element can be sensed. Additionally, in the example embodiment of an electromagnetically actuatable locking mechanism, the operating condition of the interlocking unit can also be indirectly sensed.

The device can include a two-position controller for operating the electromagnet, and a determination means. With the aid of the determination means, a time profile of a control signal output by the two-position controller at the electromagnet is determinable. Depending thereon, a particular currently present axial position of the armature rod is determinable. Depending thereon, in turn, a particular operating condition of the latching mechanisms is establishable.

A two-position controller of this type is known, for example, from DE 10 2016 221 477 A1, which is incorporated by reference herein in its entirety. The two-position controller is part of a device for operating and for determining an operating condition of an electromagnetic actuator. The known device includes a determination means in addition to the two-position controller for operating the actuator. The determination means is designed for determining a time profile of a control signal output by the two-position controller and, on the basis thereof, determining the operating condition. In particular, a dynamic of the control signal is determined for this purpose. The known device is designed for supplying an electric current and/or actuator current to the actuator on the basis of the control signal. A characteristic time profile of the actuator current forms according to the time profile of the control signal. The operating condition of the actuator is inherently contained therein, because the operating condition essentially determines the speed at which the actuator current increases and then decreases, as well as the maximum and average level of the actuator current. Finally, the operating condition of the actuator can be determined under consideration of the control signal of the two-position controller.

This knowledge can be utilized in a simple way during the operation of the device according to example aspects of the invention for determining the locking condition of the piston and of the parking lock. With respect to the device according to example aspects of the invention, the electromagnet is energized in the disengaged condition of the parking lock, in order to lock the piston, prevent an axial movement of the piston, and avoid an undesirable engagement of the parking lock.

In an embodiment of the device according to example aspects of the present invention, the piston is held against the spring force of the spring active at the piston in the energized condition of the electromagnet. For this purpose, the interlocking elements of one of the latching mechanisms are pressed radially outward by the associated actuating contour and the positive engagement is established between the interlocking elements, the sleeve, and the piston, which locks the piston and the parking lock operatively connected thereto. This prevents a displacement of the piston for engaging the parking lock in the axial direction.

Regardless of the embodiment of the sensor, the axial position of the armature rod can be determined and, depending thereon, it can be established whether the piston is locked or released and whether the parking lock is engaged or disengaged. This is possible in a simple way, since the armature rod assumes a different axial position in each of the latter operating conditions.

A preferred embodiment of the device according to example aspects of the invention includes the two actuating contours or locking contours on the movable armature rod, a coil of the electromagnet for actuating the armature rod, the piston or the parking lock piston for engaging and disengaging the parking lock, and the locking mechanism including the ball stops, the sleeve, and the radial inner groove. The two locking contours are provided for locking the piston in the engaged condition and in the disengaged condition of the parking lock. Moreover, the device in this embodiment includes the preloading spring, which is associated with the armature rod and, therefore, the locking mechanism, as well as the spring unit, which transfers the piston into a position that corresponds to the engaged condition of the parking lock.

In addition, in this example embodiment of the device, it is provided that the parking lock is disengaged against the spring force of the spring unit, which is mounted at the piston, when an appropriate hydraulic pressure is applied at the released piston. The two locking contours are arranged on the movable armature rod apart from one another in a geometric and defined manner and are aligned in opposite directions with respect to one another. As a result, one of the locking contours, which is preferably designed in the shape of a cone, can perform the task of locking in the particular condition of the parking lock in each case.

In the engaged condition of the parking lock, the preloading spring displaces the armature rod, whereby one of the locking cones relocates the locking balls of the associated ball stop into the counter-contour or the radial inner groove of the piston and the parking lock is locked in the non-energized condition of the coil of the electromagnet.

In the energized condition of the coil and in the engaged condition of the parking lock, the locking of the piston is releasable. The armature rod of the locking mechanism is then transferred into a defined intermediate position. This intermediate position can be defined, for example, by a mechanical stop, which is then present and is preferably implemented by way of at least one of the locking contours and limits the displacement of the armature rod.

In the latter operating condition of the device, the piston and/or the parking lock piston are hydraulically displaceable against the spring active at the piston and/or the parking lock piston, and the parking lock is disengageable. The locking coil is energizable during the disengagement of the parking lock and continuously thereafter. As a result, the piston is locked by way of the locking mechanism, in the disengaged condition of the parking lock, without further outlay for open-loop and closed-loop control, when the piston reaches the axial position that corresponds to the disengaged condition of the parking lock. The parking lock as well as the piston are therefore locked in the disengaged condition of the parking lock and in the energized condition of the electromagnet.

It is possible that the armature rod of the locking mechanism then has a characteristic end position, which is why the locking condition of the piston in the particular condition of the parking lock can be directly inferred from the axial position or the position of the axial rod.

The device can be designed, for example, in such a way that the air gap in the area of the electromagnet is at a maximum when the parking lock and the piston are held locked by the locking mechanism in the engaged condition of the parking lock. Moreover, it can be provided that the piston is in the released condition when the electromagnet includes an intermediate air gap, which is smaller than the maximum air gap. If the minimum air gap, which is smaller than the intermediate air gap, is present in the area of the electromagnet, the piston and the parking lock will be held locked by the locking mechanism in the disengaged condition of the parking lock.

The invention is not limited to the specified combination of features of the independent claim or the claims dependent thereon. In addition, individual features can be combined with one another, provided they arise from the claims, the description of embodiments that follows, or directly from the drawing. References in the claims to the drawings via the use of reference signs is not intended to limit the scope of protection of the claims.

BRIEF DESCRIPTION OF THE DRAWINGS

Multiple exemplary embodiments of the invention are explained in greater detail with reference to the drawings, without being limited thereto.

Wherein.

DETAILED DESCRIPTION

Figure 1:
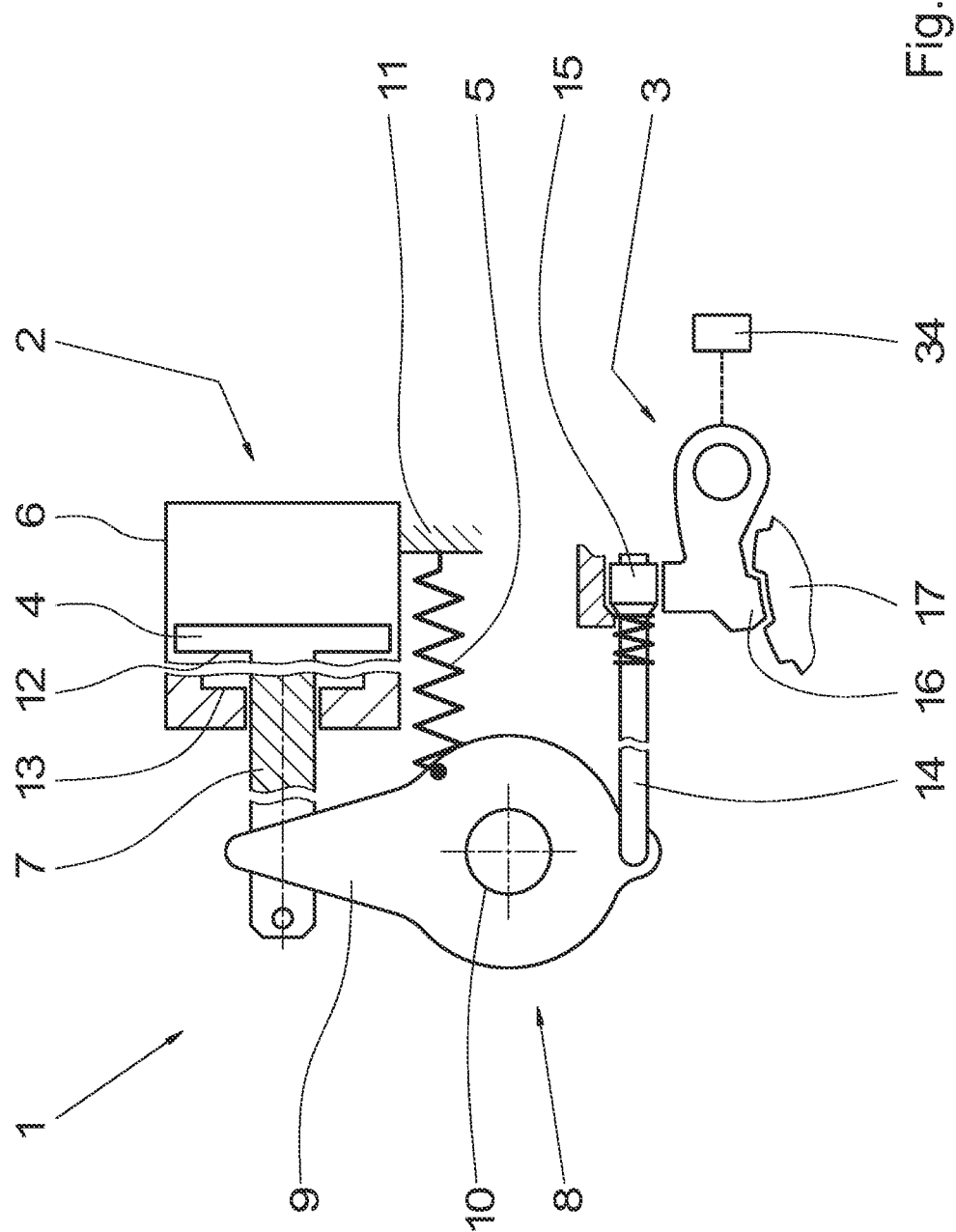
FIG. 1 shows a highly schematicized partial representation of a parking lock system of an automatic transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A schematic part longitudinal cutaway view of a parking lock system 1 known from practical experience, including a device 2 for actuating a parking lock 3, is represented in FIG. 1. The device 2 includes an actuator, which includes a piston 4, which can be acted upon by fluid. The piston 4 is actuatable in the opening direction or in the direction of a disengaged condition of the parking lock 3, depending on the particular applied fluid pressure, counter to a spring unit 5 acting in the closing direction or an engaged condition of the parking lock 3. For this purpose, the piston 4 is arranged, displaceably in the axial direction, in a cylinder 6 of the actuator. Additionally, the piston 4 is connected to a deflecting mechanism 8 via a piston rod 7. In the present case, the deflecting mechanism 8 includes a rotary disk 9, which is designed to be rotatable in the area of a pin 10. The spring unit 5 is designed as a compression spring in the present case and is connected at one end to the rotary disk 9. At the other end, the spring unit is supported in the area of a housing 11.

Moreover, the rotary disk 9 is operatively connected to a parking interlock rod 14, which is coupled to a parking interlock cone 15. The parking interlock cone 15 cooperates with a parking pawl 16. The parking pawl 16 is engageable, via an axial movement of the piston 4, with a parking interlock gear 17, which is rotationally fixed to an output shaft of a vehicle drive train, in order to rotationally fix the output shaft. If the parking pawl 16 is guided out of the engagement with the parking interlock gear 17 via an axial movement of the piston 4 in the opposite direction, the parking lock 3 is disengaged and the output shaft can rotate.

The device 202 represented in FIG. 2a through FIG. 2e for actuating the parking lock 3 has the same functionality as the device 2. Therefore, the same reference numbers are used in the description and in the drawing for structurally and functionally identical components of the devices 2 and 202.

With respect to the device 202, the spring unit 5 is arranged between an end face 12 of the piston 4 and an inner side 13 of the cylinder 6 facing the end face 12 of the piston 4. The spring unit 5 is designed as a compression spring in each case, in order to be able to engage the parking lock 3 in the non-pressurized condition of the piston 4.

FIG. 2a through FIG. 2e each show a detailed single view of the device 202 for actuating the parking lock 3 in various operating conditions, which partly correspond to an engaged condition of the parking lock 3 or to a disengaged condition of the parking lock 3. With respect to the device 202, the spring unit 5 is arranged within the cylinder 6 between the end face 12 of the piston 4 and the inner side 13 of the cylinder 6 and is designed as a compression spring. In the position of the piston 4 shown in FIG. 2a, the parking lock 3 of the parking lock system 1 is engaged.

Figure 2A:
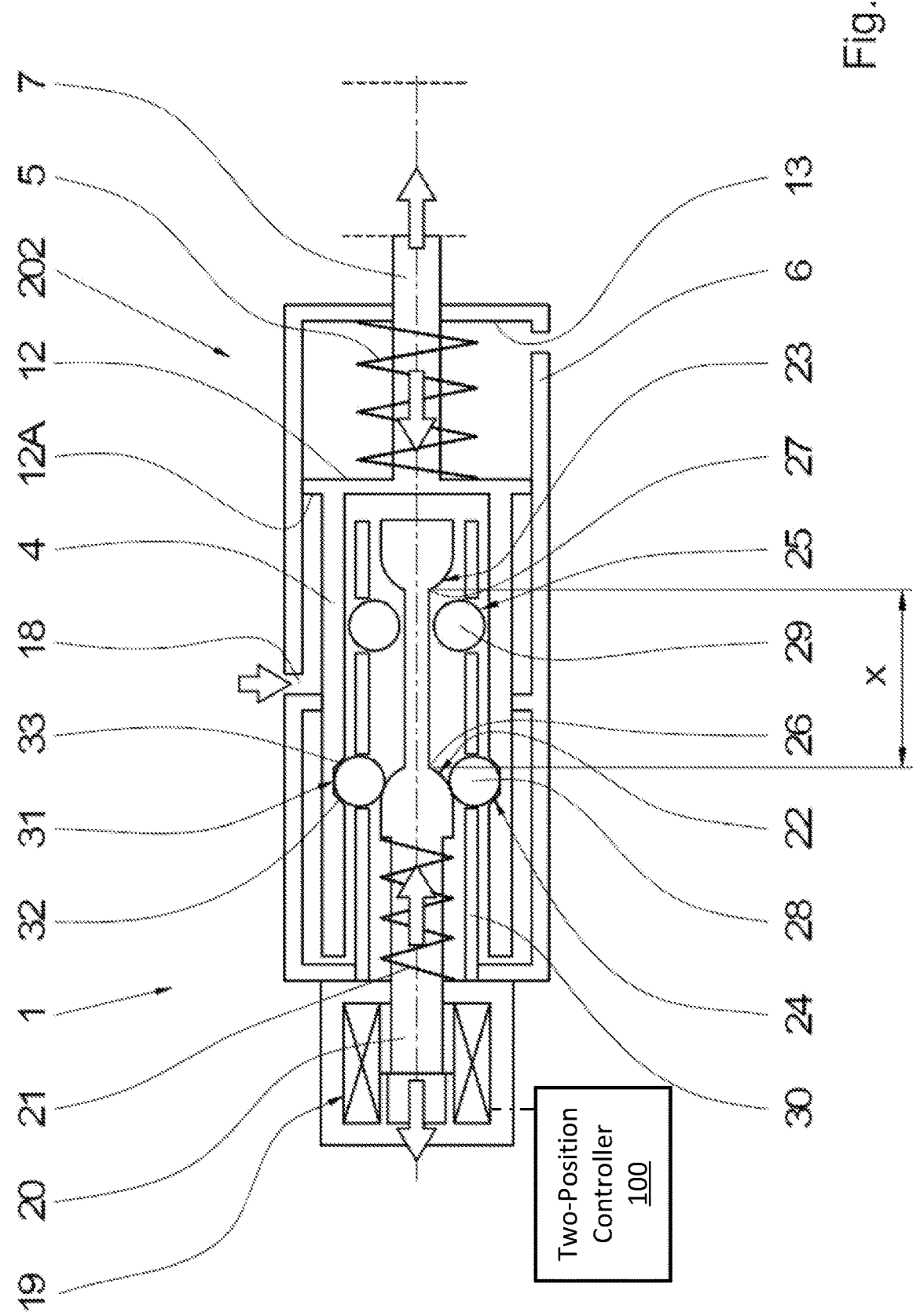
FIG. 2a to FIG. 2e show an enlarged view of a device for actuating a parking lock of the parking lock system according to FIG. 1 in various operating conditions.
Figure 2B:
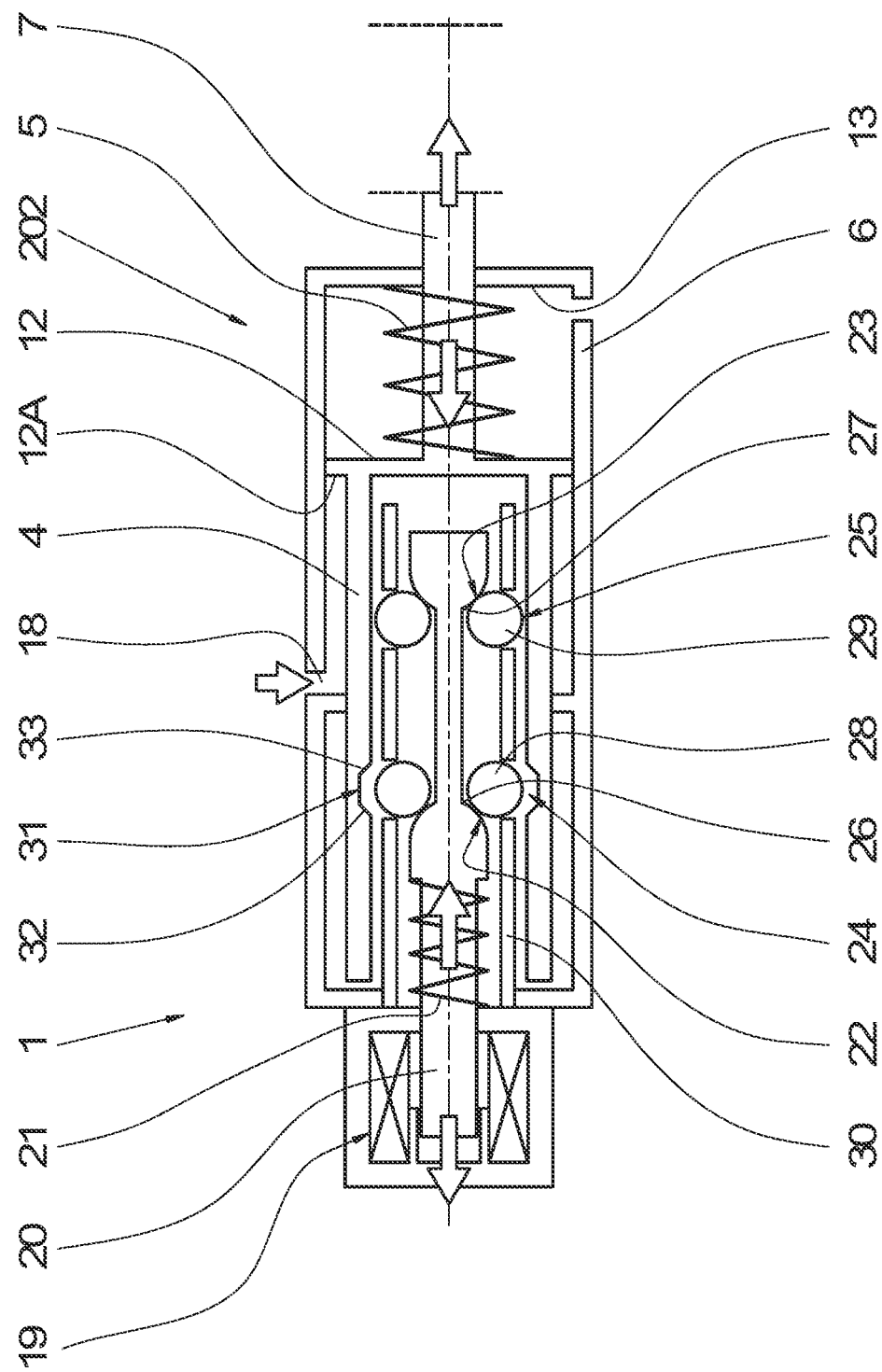
Figure 2C:
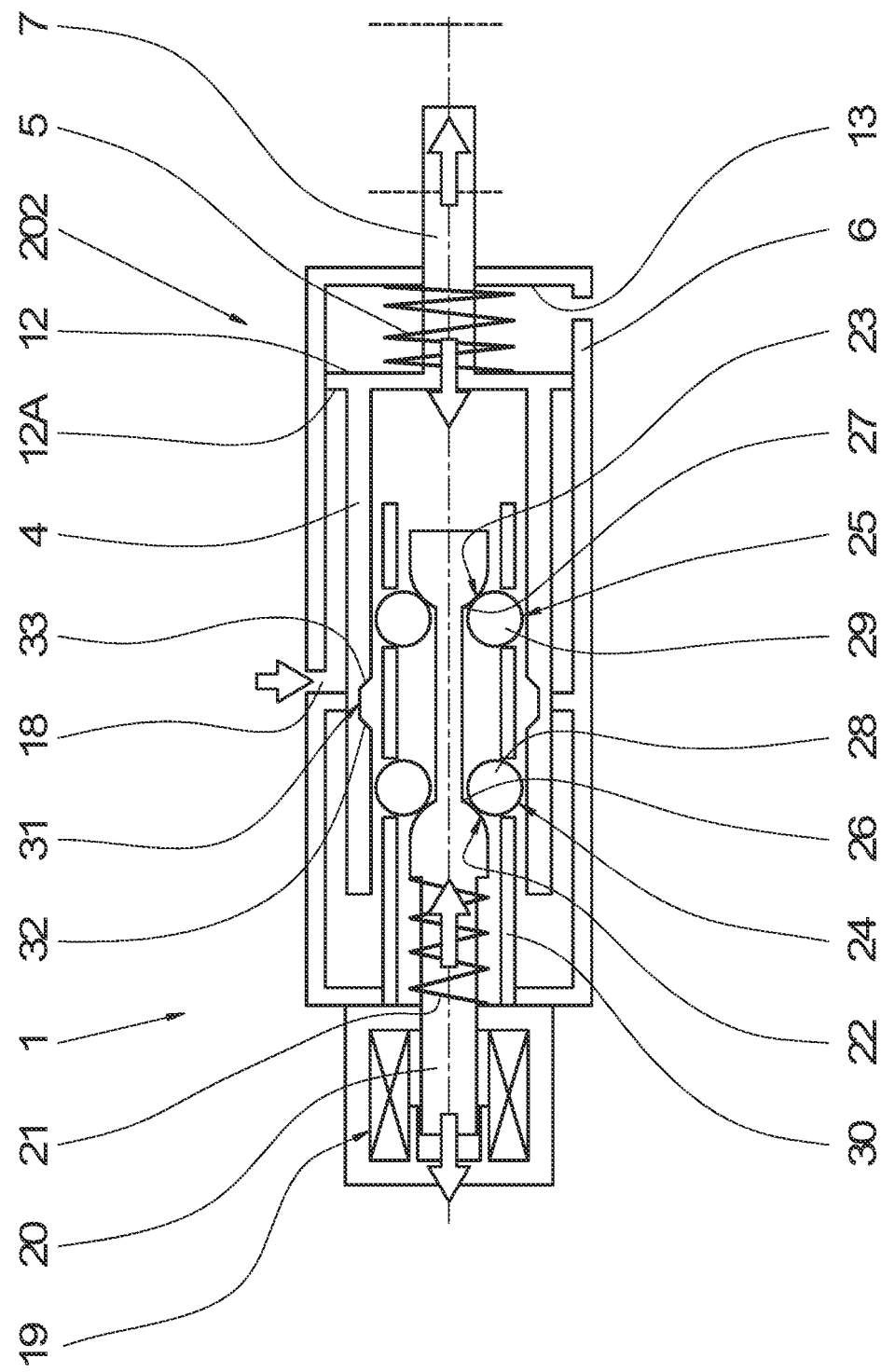
Figure 2D:
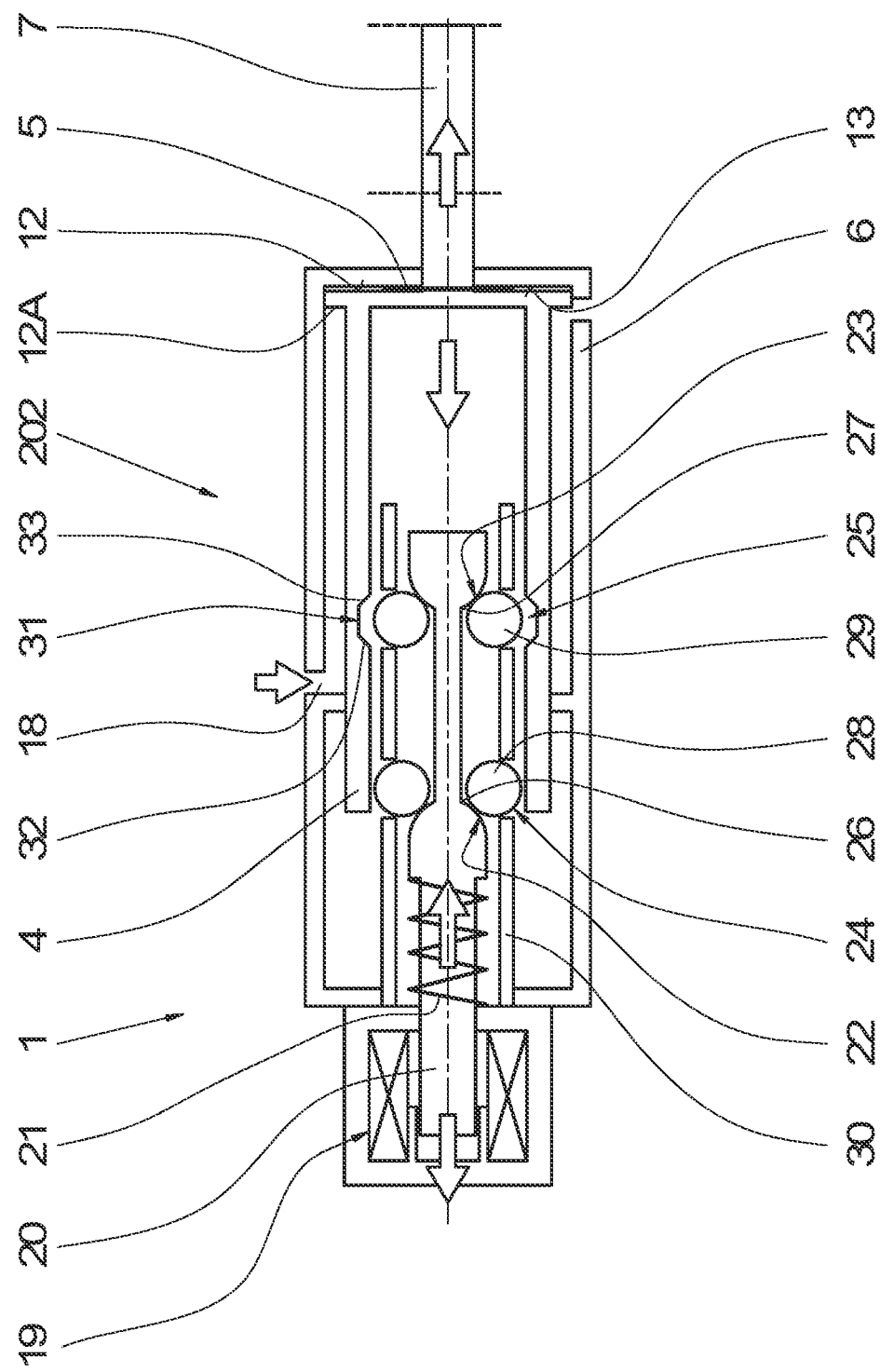
Figure 2E:
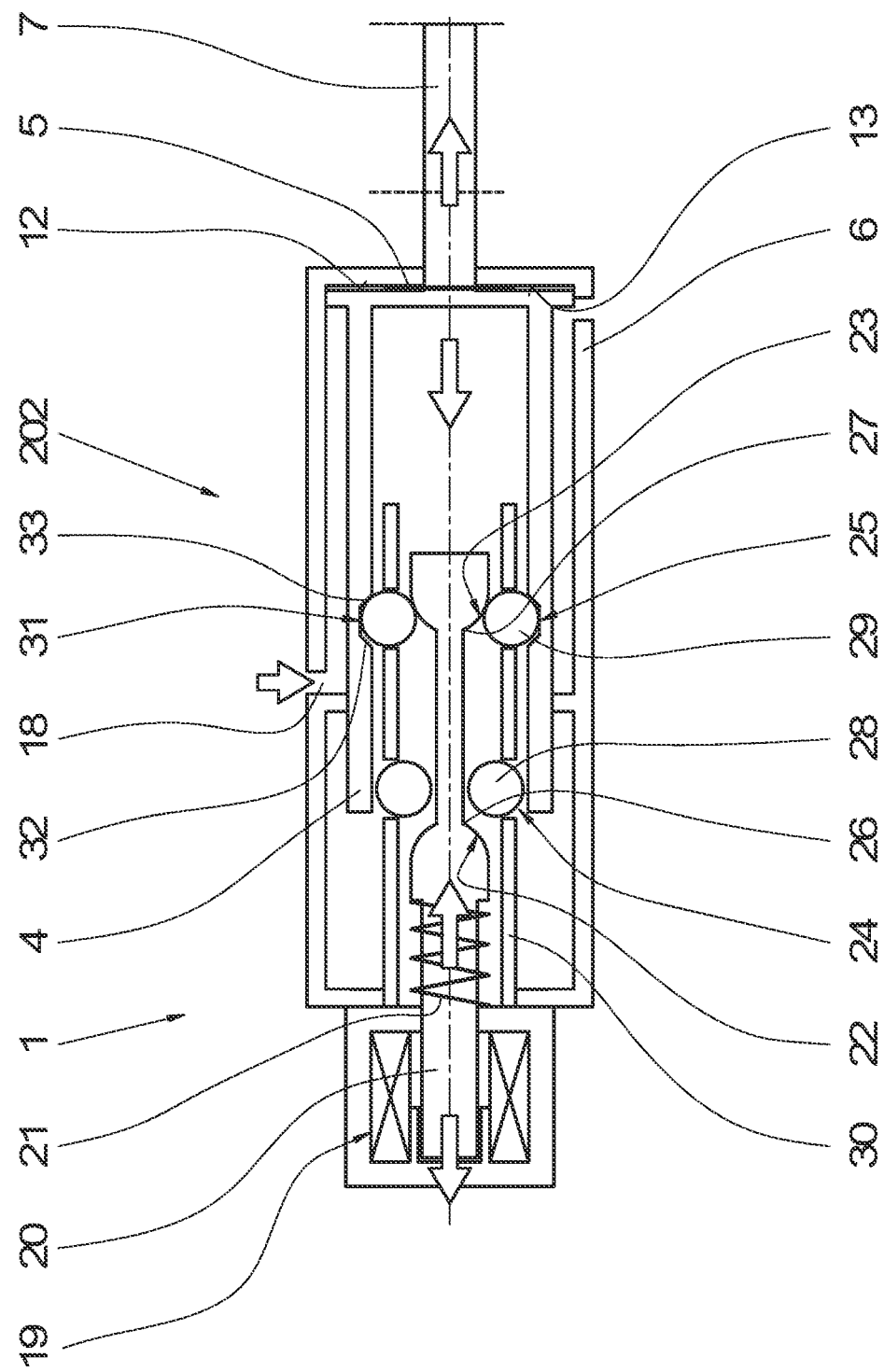

In order to disengage the parking lock 3, the piston 4 is hydraulically pressurized via a hydraulic port 18 in the area of a further end face 12A and is transferred, against the spring force of the spring unit 5, out of the first position represented in FIG. 2a into the second position represented in FIG. 2d and FIG. 2e.

In order to avoid an undesirable engagement of the parking lock 3 as well as an undesirable disengagement of the parking lock 3, the device 202 is designed in the manner described in greater detail in the following.

The device 202 includes an interlocking unit including an electromagnet 19. An armature rod 20 of the electromagnet 19 is axially displaceable within the piston 4 against the spring force of a preloading spring 21 and includes two actuating contours 22, 23 of a locking unit, which are axially spaced apart from each other and face each other. The actuating contour 22 close to the magnet is associated with a first latching mechanism 24 of the locking unit, with the aid of which the piston 4 is mechanically fixable in the engaged condition of the parking lock 3. The first latching mechanism 24 is designed as a ball stop in the present case. The actuating contour 23 remote from the magnet is associated with a second latching mechanism 25 of the locking unit, with the aid of which the piston 4 is mechanically fixable in the disengaged condition of the parking lock 3. The second latching mechanism 25 is also designed as a ball stop in the present case.

An axial distance X between a base point 26 of the actuating contour 22 close to the magnet and a base point 27 of the actuating contour 23 remote from the magnet is sized such that the piston 4 is mechanically fixable by only one of the ball stops 24 or 25 in each case.

The actuating contours 22 and 23 are designed at least approximately in the shape of a truncated cone, at least partially or in sections. The base points 26 and 27 of the actuating contours 22 and 23 each have the smallest outer diameter of the actuating contours 22, 23. Additionally, the outer diameters of the actuating contours 22, 23 constantly increase, at least partially or in areas, starting from the base points 26 and 27, respectively, as the axial distance from the base points 26 and 27 increases, in order to be able to radially displace the balls 28 and 29, respectively, to the extent described in greater detail above.

Both ball stops 24 and 25 are centrally arranged within the piston 4. The balls 28, 29 of the two ball stops 24, 25 are accommodated in an axially fixed manner in a housing-affixed sleeve 30, wherein axial movements of the balls 28, 29 with respect to the sleeve are essentially not possible. Moreover, the balls 28, 29 are radially inwardly as well as radially outwardly displaceable with respect to the sleeve 30 and can be brought into engagement or out of the engagement with the piston 4 by way of rolling at the associated actuating contour 22 or 23, respectively. The piston 4 is designed including a radial inner groove 31, into which the balls 28 and 29 of the actuating contour 22 and 23, respectively, can be brought into engagement through the sleeve 30 in the engaged condition or in the disengaged condition of the parking lock 3.

In the latter operating condition of the ball stops 24 and 25, the piston 4 is not displaceable in the axial direction of the device 202 with respect to the cylinder 6 and has a locked operating condition.

The armature rod 20 is guidable out of the position shown in FIG. 2a into the position shown in FIG. 2e against the spring force of the preloading spring 21 by energizing the electromagnet 19, in order to lock the piston 4 in the disengaged condition of the parking lock 3 and to reliably avoid an undesirable engagement of the parking lock 3. The locking unit is then interlocked by the interlocking unit.

In the non-energized condition of the electromagnet 19, the preloading spring 21 holds the armature rod 20 in the position shown in FIG. 2a when the parking lock 3 is engaged. Thereupon, the actuating contour 22 holds the balls 28 of the ball stop 24 in the radial inner groove 31, which is designed including lateral faces 32 and 33, each of which is pitched with respect to the radial direction. Thereupon, the locking unit is interlocked by the interlocking unit. Via the beveled lateral surfaces 32 and 33 of the radial inner groove 31, an undesirable misalignment or jamming of the ball stops 24 and 25 is prevented in a simple way.

If a driver-side demand to disengage the parking lock 3 is issued, for example, the electromagnet 19 is appropriately energized and pulls the armature rod 20 against the spring force of the preloading spring 21 out of the position shown in FIG. 2a in the direction of the axial position shown in FIG. 2b. Due to this axial displacement of the armature rod 20, the balls 28 of the ball stop 24 roll at the outer side of the actuating contour 22 and are guided radially inward, with respect to the piston 4, out of the engagement of the radial inner groove 31 of the piston 4. This is the case, in particular, when a hydraulic pressure is applied at the piston 4 via the hydraulic port 18, which displaces the piston 4 against the spring unit 5 in the axial direction, which corresponds to the disengaged operating condition of the parking lock.

The axial displacement of the armature rod 20 caused by the energization of the electromagnet 19 is initially limited, since the actuating contour 23 remote from the magnet comes to rest against the radially internal balls 29 in the manner represented in FIG. 2b and further actuating travel of the armature rod 20 in the direction of the end of the armature rod 20 facing the electromagnet 19 is prevented.

The released piston 4 is displaced away from the electromagnet 19 counter to the spring element 5 by the applied hydraulic pressure. During this actuating movement of the piston 4, the spring unit 5 is increasingly preloaded. FIG. 2c shows the device 202 in the latter operating condition, in which the piston 4 is locked neither by the ball stop 24 nor by the ball stop 25. As the displacement travel of the piston 4 continues to increase, the extent of overlap between the radial inner groove 31 and the ball stop 25 increases until the balls 29 is guidable radially outward by the actuating contour 23 remote from the magnet, through the sleeve 30, into the radially inner groove 31. In the process, the balls 29 are pressed radially outward into the radial inner groove 31 by the further axial actuating movement of the armature rod 20 in the direction of the electromagnet 19, which is now possible. In this operating condition of the device 202, an axial actuating movement of the piston 4 is blocked by the ball stop 25 due to the energized condition of the electromagnet 19. Therefore, in the case of a pressure drop in the area of the hydraulic port 18, an undesired engagement of the parking lock 3 is reliably avoided by way of the preloaded spring unit 5.

If there is a demand to engage the parking lock 3, the energization of the electromagnet 19 is switched off. Thereupon, the armature rod 20 is initially guided by the preloading spring 21 into the position shown in FIG. 2d, in which further actuating travel of the armature rod 20 is limited by way of the actuating contour 22 close to the magnet resting against the balls 28 of the ball stop 24. In this position of the armature rod 20, the balls 29 of the ball stop 25 is guidable radially inward, with respect to the piston 4, out of the engagement of the radial inner groove 31 and the piston 4 is releasable. If the spring force of the spring unit 5 exceeds the pressure applied at the piston 4 via the hydraulic port 18 or the resultant actuating force in the direction of the disengaged operating condition of the parking lock 3, the piston 4 is transferred in the direction of its axial position shown in FIG. 2a, which corresponds to the engaged operating condition of the parking lock 3.

In the axial position of the piston 4 shown in FIG. 2b, a radial actuating movement of the balls 28 is released by the piston 4, since the radial inner groove 31 is then in overlap with the balls 28 and the armature rod 20 is displacable by the preloading spring 21 in the direction of the spring unit 5. Therefore, the piston 4 is locked in the non-energized condition of the electromagnet 19 and in the engaged condition of the parking lock 3, and an undesirable disengagement of the parking lock 3 is prevented.

In the position shown in FIG. 2a, the armature rod 20 assumes a different axial position than the position of the piston 4 shown in FIG. 2e. Therefore, the locking state of the piston 4 or the armature rod 20 is determinable with the aid of a sensor associated with the electromagnet 19, which can be designed, for example, as a Hall sensor. This possibility offers a simple implementation of various functions, such as an adaptation of the sensor in the disengaged operating condition of the parking lock 3. A sensor 34, which is, for example, a Hall sensor, is also associated with the parking lock 3. The engaged operating condition as well as the disengaged operating condition of the parking lock 3 is determinable in a simple way with the aid of the sensor 34.

Additionally or alternatively, it is also possible that a sensor is associated with the electromagnet 19, whose mode of operation is known from DE 10 2016 221 477 A1. This sensor includes a two-position controller 100 for operating an actuator, and a determination means. The determination means is designed for determining a time profile of the control signal output by the two-position controller 100 and, on the basis thereof, determining the operating condition. In this case, the actuator corresponds to the electromagnet 19 and the control signal corresponds to the actuating current of the electromagnet 19. This means, the current axial position of the armature rod 20 is determinable with the aid of a sensor of this type depending on the particular output actuating current as well as the coil current setting in, in the area of a coil of the electromagnet 19. A mutual plausibility check of the sensor signals is possible with the aid of a comparison of the sensor signals of the sensor and of the sensor 34.

With the aid of the above-described device 202, the accuracy of the sensor provided for determining the axial position of the armature rod 20 and/or of the piston 4 and, therefore, also the operating condition of the device 2, can be improved in a simple way via an appropriate adaptation in the vehicle operation. An adaptation of this type can be carried out, in principle, in both locking positions of the piston 4.

Figure 3:
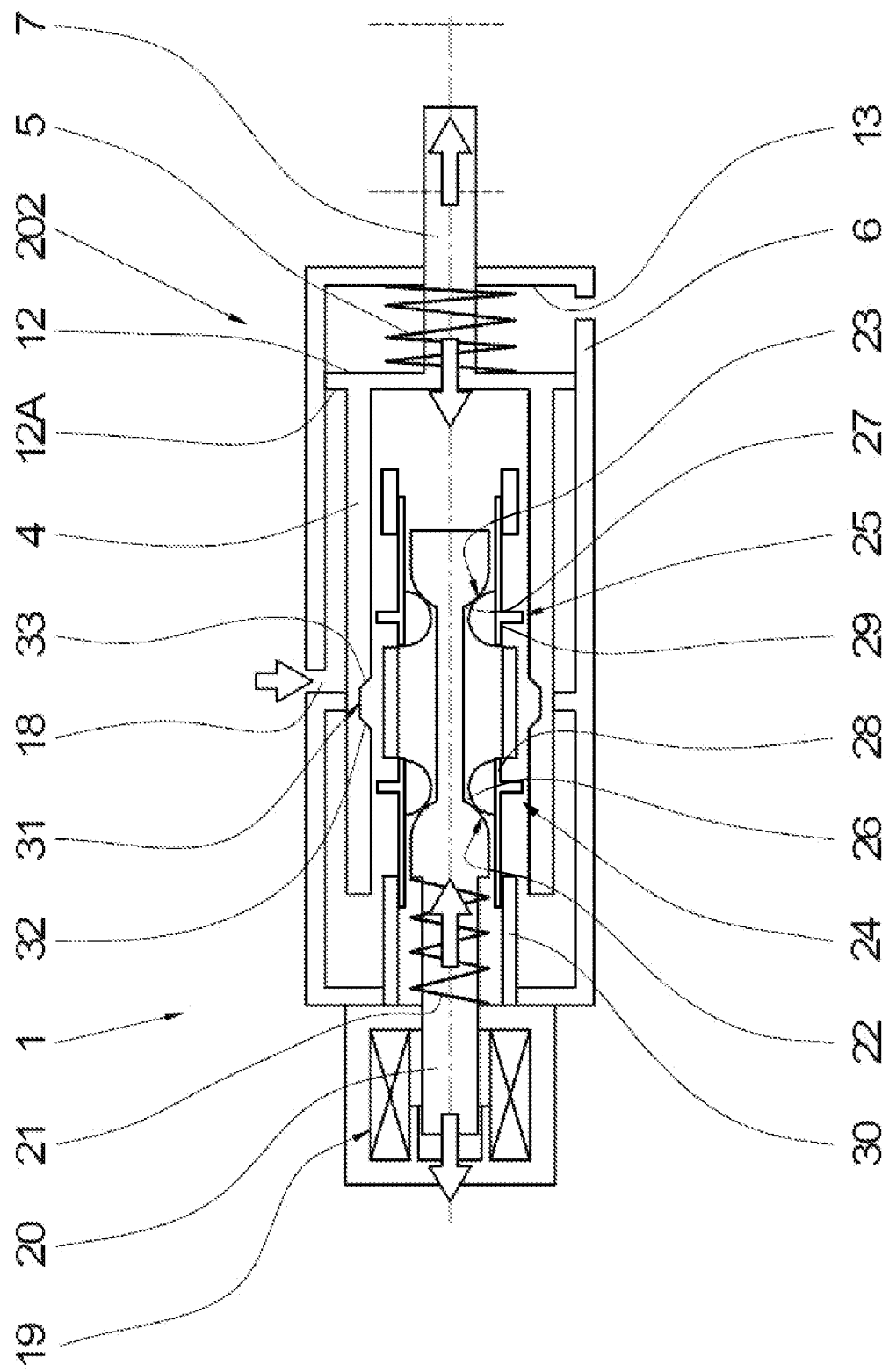
FIG. 3 shows a device for actuating a parking lock of the parking lock system according to FIG. 1 according to another example embodiment.

Moreover, it is also possible to design the latching mechanisms of the locking unit not to include the interlocking elements designed as balls, but rather including interlocking elements designed as spring arms 102, as shown in FIG. 3. The spring arms 120 are swivelably operatively connected to the cylinder 6 and preferably include a hook-like end. Interlocking elements of this type are known, for example, from EP 1 960 701 B1 and are swivelable radially outward with the aid of the actuating contours 22 and 23, in order to prevent an actuating movement of the piston 4 or, in the swiveled-in condition, to release the piston 4.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking lock system
2 device
3 parking lock
4 piston
5 spring unit
6 cylinder
7 piston rod
8 deflecting mechanism
9 rotary disk
10 pin
11 housing
12 end face of the piston
12A further end face of the piston
13 inner side of the cylinder
14 parking interlock rod
15 parking interlock cone
16 parking pawl
17 parking interlock gear
18 hydraulic port
19 electromagnet
20 armature rod
21 preloading spring
22 actuating contour
23 actuating contour
24 latching mechanism, ball stop
25 latching mechanism, ball stop
26 base point of the actuating contour 22
27 base point of the actuating contour 23
28 interlocking element, ball of the ball stop 24
29 interlocking element, ball of the ball stop 25
30 sleeve
31 radial inner groove
32, 33 lateral surface of the radial inner groove 31
32A to 33B lateral surfaces of the radial inner grooves 45 and 46
34 sensor
X axial distance of the base points

The invention claimed is:

1. A device (2; 202) for locking a piston rod (7) of a piston (4) of an actuator, which is pressurizable in order to disengage a parking lock (3) and is spring-loaded in order to engage the parking lock (3), the device (2; 202) comprising:
an electrically actuatable electromagnet (19) with an armature rod (20) that is axially movable against a spring force of a preloading spring (21), the armature rod (20) comprising two actuating contours (22, 23) that are axially spaced apart and face each other;

wherein the actuating contour (22) positioned proximate the electromagnet (19) is associated with a first latching mechanism (24) operable to mechanically fix the piston (4) in an engaged condition of the parking lock (3), wherein the actuating contour (23) positioned remote from the electromagnet (19) is associated with a second latching mechanism (25) operable to mechanically fix the piston (4) in a disengaged condition of the parking lock (3), wherein interlocking elements (28) of the first latching mechanism (24) are separate and axially spaced from interlocking elements (29) of the second latching mechanism (25), and an axial distance (X) between a base point (26) of the actuating contour (22) positioned proximate the electromagnet (19) and a base point (27) of the actuating contour (23) positioned remote from the electromagnet (19) is sized such that the piston (4) is mechanically fixable by only the first latching mechanism (24) in the engaged condition of the parking lock (3) and by only the second latching mechanism (25) in the disengaged condition of the parking lock (3), wherein both of the first and second latching mechanisms (24, 25) are centrally arranged within the piston (4), the interlocking elements (28, 29) of both of the first and second latching mechanisms (22, 23) are disposed within a housing-affixed component (30) in an axially fixed manner, and the interlocking elements (28, 29) of the first and second latching mechanisms (22, 23) are radially displaceable relative to the housing-affixed component (30) and are selectively engageable with the piston (4) by a respective actuating contour (22, 23), wherein the actuating contour (23) positioned remote from the electromagnet (19) blocks movement of the interlocking elements (29) of the second latching mechanism (25) counter to the spring force of the preloading spring (21) when the parking lock (3) is in the disengaged condition of the parking lock (3) and the electromagnet (19) is in an energized condition of the electromagnet (19), and the actuating contour (23) positioned remote from the electromagnet (19) releases the interlocking elements (29) of the second latching mechanism (25) for movement with the preloading spring (21) when the electromagnet (19) is in a non-energized condition of the electromagnet (19), and wherein the actuating contour (22) positioned proximate the electromagnet (19) blocks movement of the interlocking elements (28) of the first latching mechanism (24) with the preloading spring (21) when the parking lock (3) is in the engaged condition of the parking lock (3) and the electromagnet (19) is in the non-energized condition of the electromagnet (19), and the actuating contour (22) positioned proximate the electromagnet (19) releases the interlocking elements (28) of the first latching mechanism (24) for movement against the spring force of the preloading spring (21) when the electromagnet (19) is in the energized condition of the electromagnet (19).

2. The device of claim 1, wherein:
the two actuating contours (22, 23) have an at least partially truncated cone shape;
each base point (26, 27) of the two actuating contours (22, 23) has a smallest outer diameter of the two actuating contours (22, 23); and
outer diameters of each of the two actuating contours (22, 23) constantly increase starting from the base point (26, 27) along an axial direction.

3. The device of claim 1, wherein:
the piston (4) comprises a groove (31) at an inner side facing the armature rod (20); and
the interlocking elements (28, 29) of the first and second latching mechanisms (24, 25) are insertable into the groove (31) in a latching manner with respect to the armature rod (20) and in a radial outward direction with respect to the two actuating contours (22, 23) and the piston rod (7) when the parking lock (3) is in either the engaged condition or the disengaged condition of the parking lock (3).

4. The device of claim 3, wherein the armature rod (20) has a first axial end position in a latched condition of one of the first and second latching mechanisms (24, 25), and the piston rod (7) is held in the engaged condition of the parking lock (3) with the one of the first and second latching mechanisms (24, 25) when the armature rod (20) is at the first axial end position.

5. The device of claim 4, wherein the armature rod (20) has a second axial end position in a latched condition of the other of the first and second latching mechanisms (24, 25), and the piston rod (7) is held in the disengaged condition of the parking lock (3) with the other of the first and second latching mechanisms (24, 25) when the armature rod (20) is at the second axial end position.

6. The device of claim 5, wherein the armature rod (20) has an axial intermediate position between the first and second axial end positions when both the first and second latching mechanisms (24, 25) are in a released condition.

7. The device of claim 1, wherein the first and second latching mechanisms (24, 25) are configured as ball stops and comprise balls as the interlocking elements (28, 29).

8. The device of claim 7, wherein:
the ball stops (24, 25) of the first and second latching mechanisms (22, 23) are centrally arranged within the piston (4);
each of the balls (28, 29) of the ball stops (24, 25) of the first and second latching mechanisms (22, 23) are accommodated in an axially fixed manner in the housing-affixed component (30);
the housing-affixed component (30) is configured as a sleeve; and
each of the balls (28, 29) of the ball stops (24, 25) of the first and second latching mechanisms (22, 23) are radially displaceable with respect to the sleeve (30) and are selectively engageable with the piston (4) by way of rolling at the respective actuating contour (22, 23).

9. The device of claim 1, wherein:
the interlocking elements of the first and second latching mechanisms (22, 23) are configured as spring arms;
first ends of the spring arms are fixed on a housing side; and
second ends of the spring arms are each swivelable relative to a respective first end by way of the actuating contours and, as a result, are selectively engageable with the piston in a form-locking manner.

10. The device of claim 1, further comprising:
a two-position controller configured for operating the electromagnet (19); and
a determination means for determining a time profile of a control signal output by the two-position controller at the electromagnet (19), for determining a particular currently present axial position of the armature rod (20) based on the time profile, and for determining an operating condition of the first and second latching mechanisms (24, 25) in each case based on the particular currently present axial position of the armature rod (20).

11. The device of claim 1, wherein the electromagnet (19) is operable to only move the armature rod (20) to a position corresponding to the disengaged condition of the parking lock (3).

* * * * *